(12) United States Patent
Kojima

(10) Patent No.: US 8,602,449 B2
(45) Date of Patent: Dec. 10, 2013

(54) VEHICLE SEAT

(75) Inventor: Michiaki Kojima, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 67 days.

(21) Appl. No.: 12/990,978

(22) PCT Filed: May 11, 2009

(86) PCT No.: PCT/JP2009/058760
§ 371 (c)(1),
(2), (4) Date: Nov. 4, 2010

(87) PCT Pub. No.: WO2010/131322
PCT Pub. Date: Nov. 18, 2010

(65) Prior Publication Data
US 2012/0043791 A1      Feb. 23, 2012

(51) Int. Cl.
*B60R 21/207*      (2006.01)
*B60N 2/42*      (2006.01)

(52) U.S. Cl.
USPC ............... 280/730.2; 280/728.2; 297/216.13; 297/284.9

(58) Field of Classification Search
USPC ............. 280/728.2, 730.2; 297/216.13, 284.9
IPC ..................................................... B60R 21/207
See application file for complete search history.

(56) References Cited

U.S. PATENT DOCUMENTS

| | | | | |
|---|---|---|---|---|
| 3,623,768 A | * | 11/1971 | Capener et al. .............. | 297/330 |
| 4,500,136 A | * | 2/1985 | Murphy et al. ............ | 297/284.9 |
| 4,636,000 A | * | 1/1987 | Nishino ..................... | 297/284.9 |
| 5,799,971 A | * | 9/1998 | Asada ......................... | 280/730.2 |
| 5,810,389 A | * | 9/1998 | Yamaji et al. .............. | 280/730.2 |
| 5,988,674 A | * | 11/1999 | Kimura et al. .............. | 280/730.2 |
| 6,302,431 B1 | * | 10/2001 | Sasaki et al. ............... | 280/728.2 |
| 6,450,528 B1 | * | 9/2002 | Suezawa et al. ........... | 280/730.2 |
| 6,802,563 B1 | * | 10/2004 | Mysliwiec et al. ........ | 297/284.9 |
| 7,216,934 B1 | * | 5/2007 | Kobari ........................ | 297/284.9 |
| 7,290,794 B2 | * | 11/2007 | Tracht ......................... | 280/730.2 |
| 7,322,597 B2 | * | 1/2008 | Tracht ......................... | 280/728.3 |
| 7,350,803 B2 | * | 4/2008 | Abramczyk et al. ....... | 280/730.2 |
| 7,393,005 B2 | | 7/2008 | Inazu et al. | |
| 7,641,281 B2 | * | 1/2010 | Grimm ..................... | 297/216.13 |
| 7,669,888 B2 | * | 3/2010 | Sato et al. .................. | 280/730.2 |

(Continued)

FOREIGN PATENT DOCUMENTS

| | | |
|---|---|---|
| CN | 1810549 | 8/2006 |
| JP | 8-324312 | 12/1996 |

(Continued)

*Primary Examiner* — Joseph Rocca
*Assistant Examiner* — Laura Freedman
(74) *Attorney, Agent, or Firm* — Finnegan, Henderson, Farabow, Garrett & Dunner, LLP

(57) ABSTRACT

A vehicle seat is provided with: paddles configuring frames of a side support of a seat back; a side support adjusting mechanism including a paddle drive mechanism receiving adjustment force and displacing the paddles in a seat width direction; a side airbag provided in a folded state at a seat width direction edge portion inside the seat back, receiving a gas supply and deploying forwards in the seat front-rear direction while inflating; and a frame moving structure for displacing the paddle inward in the seat width direction by deployment pressure of the side airbag. In the frame moving structure, the paddle drive mechanism, for driving the paddle inward in the seat width direction, allows relative displacement of the paddle in the seat width direction.

8 Claims, 13 Drawing Sheets

(56) References Cited

U.S. PATENT DOCUMENTS

| | | | |
|---|---|---|---|
| 7,681,907 B2* | 3/2010 | Svenbrant et al. | 280/728.2 |
| 7,695,004 B2* | 4/2010 | Inoue | 280/730.2 |
| 7,708,343 B2* | 5/2010 | Kayumi et al. | 297/284.9 |
| 7,963,553 B2* | 6/2011 | Huynh et al. | 280/730.2 |
| 2006/0163850 A1 | 7/2006 | Inazu et al. | |
| 2008/0088159 A1 | 4/2008 | Grimm | |
| 2010/0283229 A1* | 11/2010 | Feller et al. | 280/728.2 |

FOREIGN PATENT DOCUMENTS

| | | |
|---|---|---|
| JP | 8-324372 | 12/1996 |
| JP | 2005-13337 | 1/2005 |
| JP | 2005-208027 | 8/2005 |
| JP | 2006-205765 | 8/2006 |
| JP | 2008-80988 | 4/2008 |
| JP | 2008-220640 | 9/2008 |
| JP | 2008-541896 | 11/2008 |

* cited by examiner

VEHICLE SEAT

CROSS-REFERENCE TO RELATED APPLICATIONS

This application is a national phase application of International Application No. PCT/JP2009/058760, filed May 11, 2009, the contents of which are incorporated herein by reference.

TECHNICAL FIELD

The present invention relates to a vehicle seat.

RELATED ART

Side support adjusting devices are known in which side supports are adjusted by driving a push arm, configuring a frame of a side support of a seat back, with an actuator (see, for example, Japanese Patent Application Laid-Open (JP-A) No. 2008-220640 and JP-A No. 2005-013337).

Vehicle seats are also known in which an airbag module is installed in a side support section in a seat back (see, for example, JP-A No. 2006-205765 and JP-A No. 8-324312). In the technology of the former, configuration is made such that an airbag is deployed through an opening that has been formed between the side support section and the seat back cover by displacing the side support section towards the seat front by deployment pressure of the airbag. In the technology of the later, configuration is made such that a back board formed with notches is elastically deformed by deployment pressure of an airbag, and the airbag is deployed through an opening formed between the back board and a side support.

DISCLOSURE OF THE INVENTION

Problem to be Solved by the Invention

However, when both a side support adjusting mechanism and a side airbag are provided at a seat width direction edge portion in a seat back, there is need for a frame member, configuring the side support adjusting device, not to impede deployment of the side airbag.

An object of the present invention is to provide a vehicle seat that can obtain good deployment of a side airbag in a configuration in which a side support mechanism and a side airbag are installed in a seat back.

Method of Solving the Problem

A vehicle seat according to a first aspect of the present invention is provided with: a side support adjusting mechanism including a frame member configuring a frame of a side support of a seat back and a frame drive mechanism that receives adjustment force and displaces the frame member in a seat width direction; a side airbag provided in a folded state at a seat width direction edge portion within the seat back so as to overlap with the frame member in side view, which inflates by receiving a gas supply and deploys towards the front in the seat front-rear direction; and a frame moving structure for displacing a portion of the frame member including at least an outside portion in the seat width direction, or the whole of the frame member, inward in the seat width direction (towards the seat width direction inside) by deployment pressure of the side airbag.

According to the above aspect, adjustment force is imparted manually or automatically to the frame drive mechanism when adjusting the side supports. The side supports are then adjusted by the frame drive mechanism displacing the frame member in the seat width direction. The frame drive mechanism may be any that displaces the frame member in at least one of the seat width directions. In the present vehicle seat, the frame member is displaced towards the seat width direction inside by deployment pressure of the side airbag when the side airbag is inflated and deployed. The frame member can thereby be prevented or suppressed from impeding side airbag deployment, giving good deployment of the side airbag forwards in the seat front-rear direction.

In this manner, the present vehicle seat can deploy the side airbag well in a configuration in which a side support mechanism and a side airbag are installed in a seat back.

In the above aspect, the side support adjusting mechanism may be configured to allow displacement of the frame member inward in the seat width direction by the frame drive mechanism in a state in which relative displacement of the frame member inward in the seat width direction is allowed, and the side support adjusting mechanism is configured to further include a biasing member that biases the frame member outward in the seat width direction, (towards the seat width direction outside) as a result of which the frame moving structure is configured so as to displace the frame member inward in the seat width direction (towards the inside in the seat width direction) against biasing force of the biasing member by the frame member being pressed forwards in the seat front-rear direction by deployment pressure of the side airbag.

According to the above aspect, adjustment force is imparted manually or automatically to the frame drive mechanism when adjusting the side supports towards the seat width direction inside, and the frame member is displaced towards the seat width direction inside by the frame drive mechanism. However, when the adjusting the side supports towards the seat width direction inside, a support portion of the frame member is displaced towards the seat width direction outside by the frame drive mechanism. The frame member is thereby displaced towards the seat width direction outside by bias force of the biasing member until contact to the support portion by the frame drive mechanism. The frame drive mechanism here enables driving of the frame member towards the seat width direction inside while displacement of the frame member towards the seat width direction inside is still allowed, or in other words, the frame member is not restrained from movement relative to the frame drive mechanism at least towards the seat width direction inside. Accordingly, in the present vehicle seat, the frame member is displaced to the seat width direction inside with a low load accompanying deployment of the side airbag, and good deployment of the side airbag can be made forwards in the seat front-rear direction.

In the above aspects, the frame drive mechanism may be configured so as to displace a front portion of the frame member in the seat front-rear direction inward in the seat width direction by a press member that does not restrain the frame member, pressing a seat front-rear direction rear portion of the frame member outward in the seat width direction, and the frame moving structure is configured so as to displace the seat front-rear direction front portion of the frame member inward in the seat width direction against the biasing force of the biasing member by the front portion of the frame member being pressed forwards in the seat front-rear direction by deployment pressure of the side airbag.

According to the above aspect, when adjustment force is imparted manually or automatically to the frame drive mechanism in order to adjust the side support towards the seat width direction inside, the press member presses the seat front-rear direction rear portion of the frame member towards the seat width direction outside. The front portion of the seat width direction on the frame member is thereby displaced towards the seat width direction inside. Due to the press member of the frame drive mechanism, which does not restrain the frame member, when the front portion of the frame member is pressed towards the seat front by the deployment pressure of the side airbag, the frame member is displaced smoothly towards the seat width direction inside, without the frame member interfering with the press member.

In the above aspects, the frame moving structure may be configured so as to displace the frame member inward in the seat width direction by a connected state of the frame member to the frame drive mechanism being released by deployment pressure of the side airbag.

According to the above aspect, when the side airbag is inflated and deployed, the connected state of the frame member to the frame drive mechanism is released by the deployment pressure, and the frame member is displaced towards the seat width direction inside. Consequently, in the present vehicle seat, the frame member is displaced towards the seat width direction inside by a low load, and the side airbag can be well deployed towards the front in the seat front-rear direction. There are also few limitations to the connecting structure (adjustment force transmitting structure) or the like, between the frame member and the frame drive mechanism.

In the above aspect, in the side support adjusting mechanism, the frame drive mechanism may be connected to the frame member at a plurality of locations, and the frame moving structure is configured so as to displace the frame member inward in the seat width direction by a connected state of one connection location of the frame member to the frame moving structure being released by deployment pressure of the side airbag while a connected state of another portion of the frame member to the frame drive mechanism is maintained.

According to the above aspect, due to the connected state of a portion of the plural connected portions between the frame member and frame drive mechanism being maintained, the frame member can be retained to the seat back side when the side airbag is deployed.

In the above aspects, the frame moving structure may be configured with the outside portion of the frame member in the seat width direction being a movable portion that is either deformable or relatively displaceable with respect to an inside portion of the frame member, such that the movable portion is displaced inward in the seat width direction by the movable portion being pressed forwards in the seat front-rear direction by deployment pressure of the side airbag.

According to the above aspect, the movable portion of the frame member is displaced towards the seat width direction inside when in receipt of deployment pressure of the side airbag. Accordingly, good deployment of the side airbag can be secured without the whole of the frame member being displaced towards the seat width direction inside. Therefore, there are few limitations to the connection structure or the like between the frame member and the frame drive mechanism.

In the above aspects, the side support adjusting mechanism may be configured to further include a drive source that generates adjustment force for the side support.

According to the above aspect, the side support can be adjusted with the driving force, without relying on, for example, force (manual operation) of a seated occupant. In such cases, for example, by employing the frame member moving mechanism of any one of claim 2 to claim 6, adjustment of the side support by driving force, and displacement of the frame member by low load during side airbag deployment, can both be achieved.

In the above aspects, the frame member may be disposed in a seat top-bottom direction in a region of the abdominal region of a seated occupant, and the side airbag is deployed in the seat top-bottom direction so as to be capable of restraining from the chest region to the lumbar region or from the shoulder region to the lumbar region of the seated occupant.

According to this aspect, the side airbag is deployed at a height region from the chest portion or the shoulder region of a seated occupant to the lumbar region thereof, and the seated occupant is well protected. In this side airbag, the side airbag is deployed to wrap the frame member also at one or other of the seat top-bottom direction sides in side view, but the side airbag frame member is displaced by the deployment pressure of the side airbag to the seat width direction inside, in the manner described above, and the side airbag is deployed well.

Effect of the Invention

The vehicle seat according to the present invention as described above exhibits the excellent effect of enabling good deployment of a side airbag in a configuration in which a side support mechanism and side airbag are installed in a seat back.

BEST MODE OF IMPLEMENTING THE INVENTION

Explanation follows regarding a vehicle seat 10 according to an exemplary embodiment of the present invention, with reference to FIG. 1 to FIG. 6. Note that appropriate arrows FR, arrows UP, arrows RH, and arrows LH in each of the figures indicate, respectively, the forward direction (direction of progression), upwards direction, the right hand side, this being one side in the vehicle width direction, and the left hand side, this being the other side thereof, of a vehicle to which the vehicle seat 10 is applied, and correspond to the seat front direction, seat top direction, and the right hand side and left hand side in the seat width direction.

Figure 4:
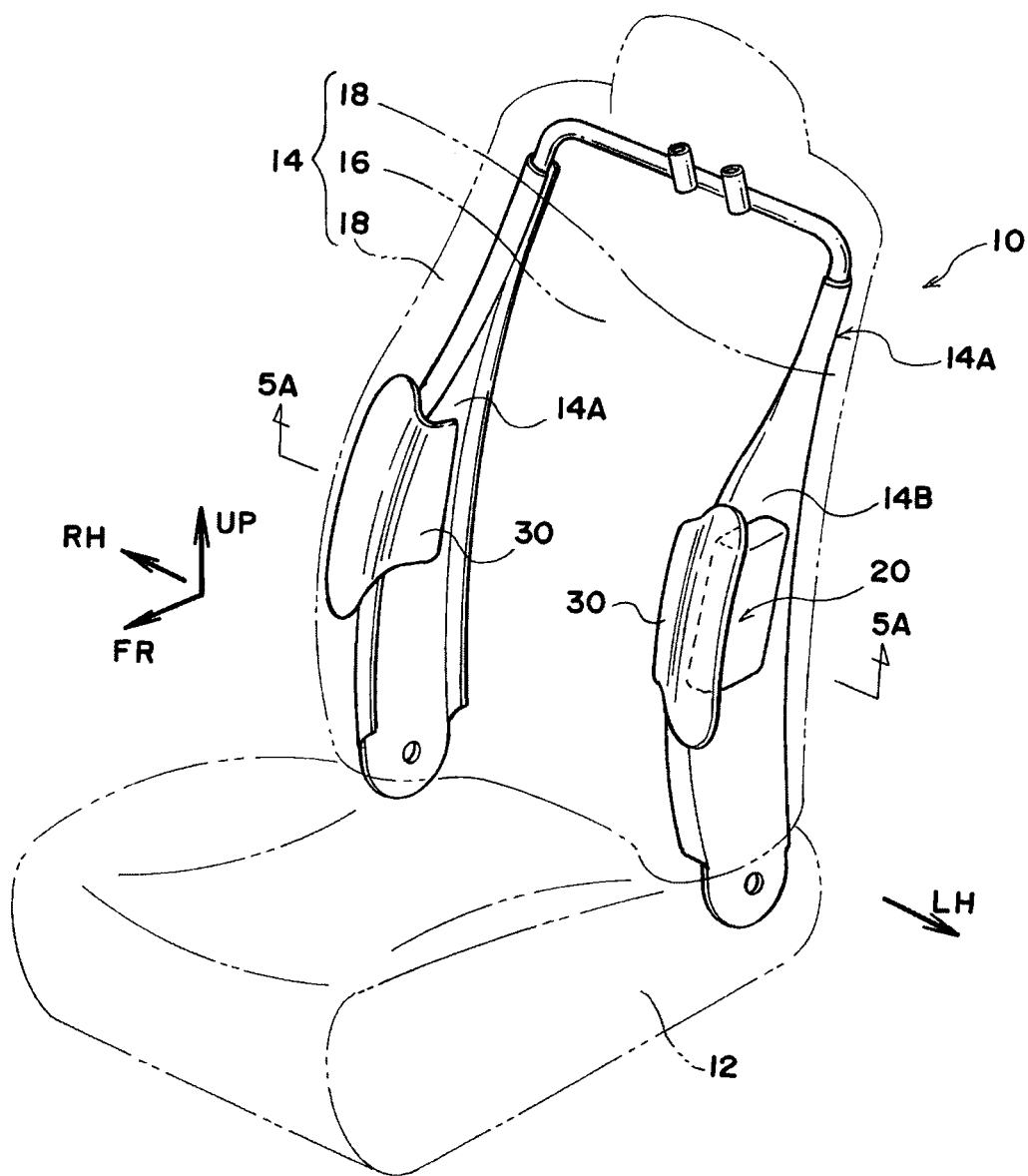
FIG. 4 is a perspective view showing an outline configuration of a vehicle seat according to the first exemplary embodiment of the present invention.
Figure 5:
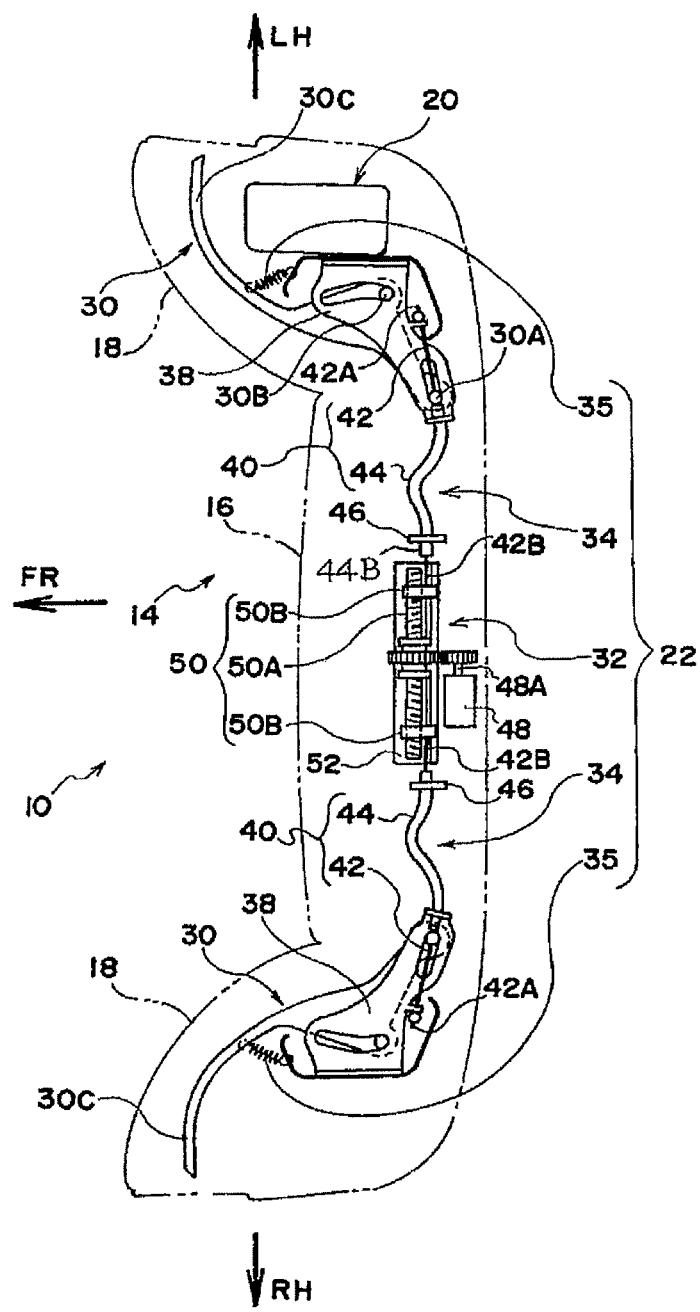
FIG. 5 is a cross-section from below, taken along line 5A-5A in FIG. 4.

A perspective view of an outline overall configuration of the vehicle seat 10 is shown in FIG. 4. A cross-section taken along line 5-5 of FIG. 4 is shown in FIG. 5. As shown in FIG. 4, the vehicle seat 10 is configured with a seat cushion 12, for an occupant of a vehicle to sit on, and a seat back 14 whose bottom edge is connected at the rear edge side of the seat cushion 12.

As shown in FIG. 5, the seat back 14 has a back rest 16, for supporting the upper body of an occupant from the vehicle rear direction, and a pair of left and right side supports 18, projecting out towards the seat front from both seat width direction edges on the back rest 16. The pair of left and right side supports 18 is configured so as to support the upper body of an occupant from the sides. The seat back 14 is configured with a cushion material 36 and a cover material 54 supported by a seat back frame 14A, described below, with the rear side thereof covered by a back board 15.

A side airbag module 20 and a side support adjusting mechanism 22 are installed in the seat back 14 configuring the vehicle seat 10. The side airbag module 20 and the side support adjusting mechanism 22 are supported by the seat back frame 14A configuring the seat back 14. The side airbag module 20 is disposed inside the side support 18 at the vehicle width direction outside of the seat back 14. The side support adjusting mechanism 22 is configured so as to adjust the left and right side supports 18 (the angle and separation thereof). A more specific explanation thereof is given below.

Figure 2:
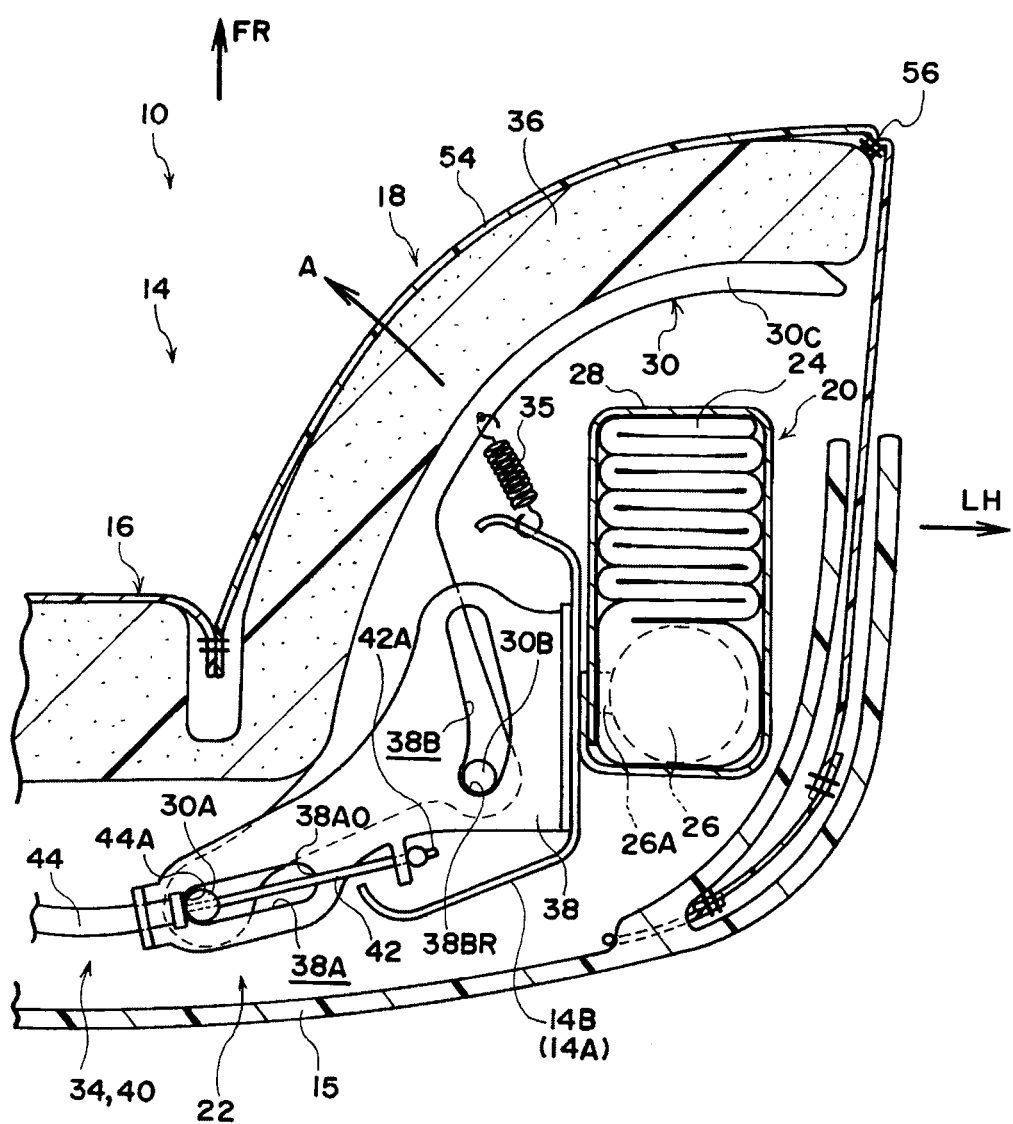
FIG. 2 is a cross-section from below showing an enlargement of a side support section configuring a vehicle seat according to the first exemplary embodiment of the present invention.

The side airbag module 20 is configured including: a side airbag 24 that is in a folded state, and inflates and deploys towards the vehicle front on receipt of a gas supply; an inflator 26 that, on actuation, generates gas for supply to the side airbag 24; and a cover material 28 that covers the side airbag 24 when in the folded state and the inflator 26. In the present exemplary embodiment, as shown in FIG. 2, the inflator 26 is provided in an orientation running along the seat top-bottom direction, inside a rear portion in the seat front-rear direction of the side airbag 24 in the folded state. The inflator 26 is configured so as to be actuated when a side impact of a vehicle applied with the vehicle seat 10 is detected (as being unavoidable).

Accordingly, the side airbag module 20 is configured such that the side airbag 24 is directly supplied with gas generated by the inflator 26. The side airbag module 20 is fastened to a side frame 14B, extending along the seat top-bottom direction at the seat width direction outside edge of the seat back frame 14A, by a bolt 26A provided to the inflator 26 and a nut, not shown in the figures. The cover material 28 is configured so as to be readily ruptured with inflation of the side airbag 24.

Figure 6A:
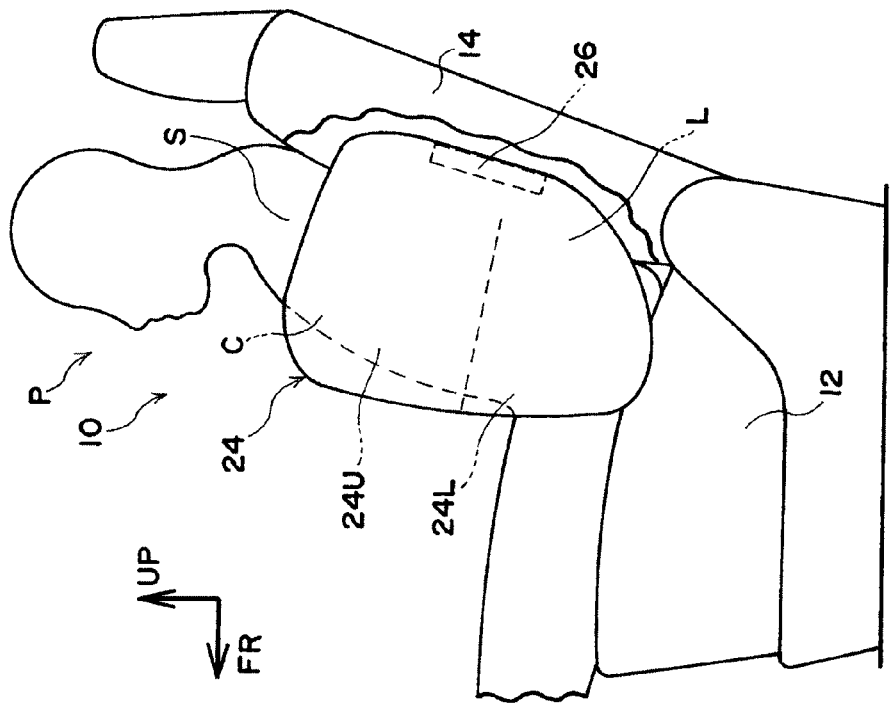
FIG. 6A is a side view showing a deployed state of a side airbag according to a first example configuring a vehicle seat according to the first exemplary embodiment of the present invention.
Figure 6B:
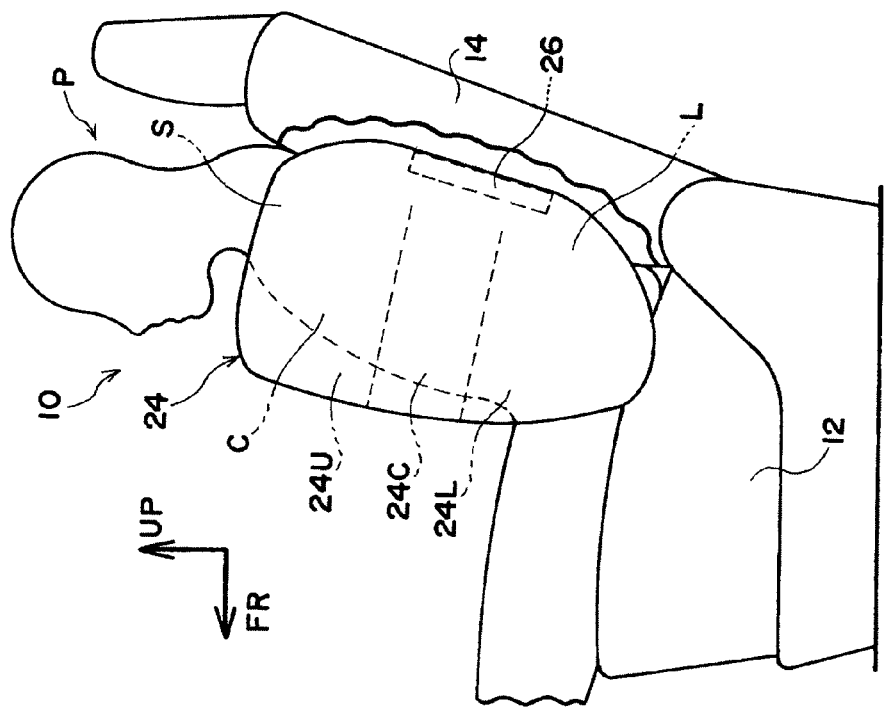
FIG. 6B is a side view showing a deployed state of a side airbag according to a second example configuring a vehicle seat according to the first exemplary embodiment of the present invention.

The side airbag 24 is configured so as to deploy in the seat top-bottom direction (in side view) from a lumbar region L to a chest region C of a seated occupant P of the vehicle seat 10, as shown in FIG. 6A, or from the lumbar region L to a shoulder region S of a seated occupant of the vehicle seat 10, as shown in FIG. 6B.

In the example of FIG. 6A, the side airbag 24 in the deployed state is configured, in side view, so as to be partitioned into upper and lower chambers 24U, 24L. In this example, the chamber 24L, at the lower side corresponding to the lumbar region L of the seated occupant P, is configured so as to maintain a higher internal pressure than the chamber 24U, at the upper side corresponding to the chest region C of the seated occupant P. However, in the example of FIG. 6B, configuration is made so as to partition, in side view, into three chambers 24U, 24C, 24L. In this example the chamber 24L, at the lower side corresponding to the lumbar region L of the seated occupant P, and the upper chamber 24U, corresponding to the shoulder region S, are configured so as to maintain a higher internal pressure than the intermediate chamber 24C, corresponding to the chest region C of the seated occupant P. Since the side airbag 24 of upper-lower two section or three section structure as described above is a known configuration, detailed explanation thereof is omitted.

Figure 3:
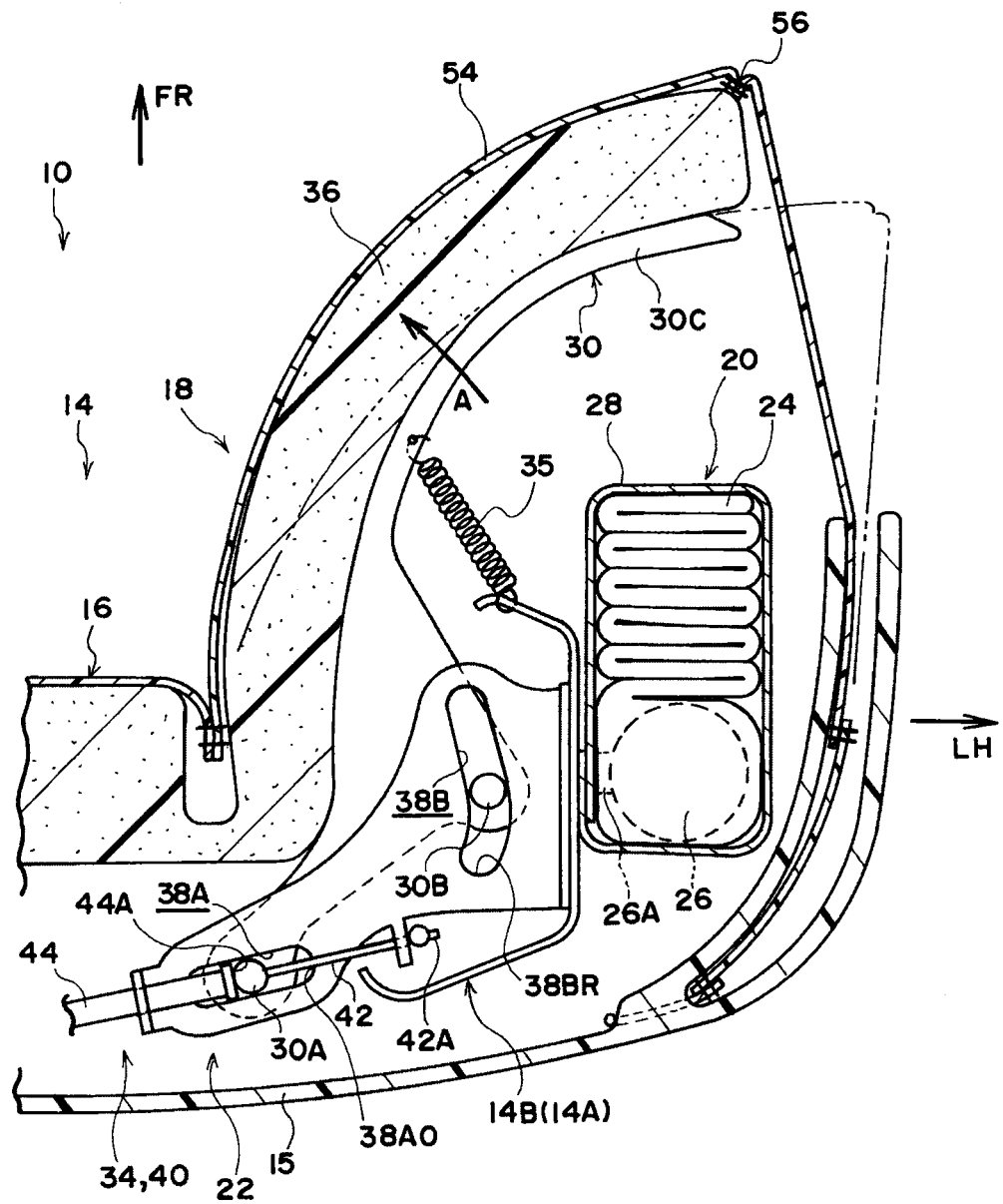
FIG. 3 is a cross-section from below showing an enlargement of an adjustment state of a side support section configuring a vehicle seat according to the first exemplary embodiment of the present invention.

The side support adjusting mechanism 22 shown in FIG. 4 and FIG. 5 has a pair of left and right paddles 30 each respectively serving as a frame member, and frame sections of the left and right side supports 18 are configured by the left and right paddles 30. The vehicle seat 10 is configured such that the side supports 18 are adjusted by displacing the paddles 30 in the seat width direction. More specifically, as shown in FIG. 2 and FIG. 3, the paddles 30 support portions of the cushion material (pads) 36 configuring the side supports 18 from the seat width direction outside and from the seat front-rear direction rear. The restrained state of the seated occupant P due to the left and right side supports 18 (position, orientation and shape thereof) is adjusted by displacing the paddles 30 in the seat width direction.

As shown in FIG. 4, the paddles 30 in the present exemplary embodiment are disposed at a top-bottom direction intermediate portion of the side supports 18 (seat back 14). The left and right paddles 30 are disposed in a region including the abdominal region (between the lumbar region L and the chest region C) of the seated occupant P of the vehicle seat 10. Namely, the paddles 30 are disposed so as to overlap in the seat top-bottom direction with the side airbag module 20 (the side airbag 24 in the folded state). As shown in FIG. 2 and FIG. 3, the paddles 30 are configured with portions protruding out to the seat width direction outside relative to the side frame 14B within the adjustable range of the left and right side supports 18, such that these portions are positioned to the seat front side of the side airbag module 20.

As shown in FIG. 5, the side support adjusting mechanism 22 is further provided with a power section 32 for generating adjustment force to adjust the left and right side supports 18, a paddle drive mechanism 34, serving as a frame drive mechanism, that receives adjustment force from the power section 32 and displaces the paddles 30 in the seat width direction, and return springs 35, serving as biasing members, that bias the paddles 30 towards a specific position. The side support adjusting mechanism 22 configured to adjust the side supports 18 against biasing force of the return springs 35 by converting adjustment force of the power section 32 into displacement force of the paddles 30 using the paddle drive mechanism 34. A specific explanation follows below, however, since the left and right paddles 30 and the paddle drive mechanism 34 are configured substantially with left-right symmetry, explanation is of the paddle 30 and the paddle drive mechanism 34 on one of the left-right sides (disposed at the side airbag module 20 side in the example illustrated).

The paddle drive mechanism 34 has a bracket 38 fixed to the seat width direction inside relative to the side frame 14B. An elongated hole (guide groove) 38A is formed to a portion at the seat width direction inside of the bracket 38, with its length direction running along the seat width direction, and an elongated hole (guide groove) 38B is formed to a portion at the seat width direction outside of the bracket 38, with its length direction running along the seat front-rear direction. Guide pins 30A, 30B, projecting out of the paddle 30 at the seat front-rear direction rear edge side thereof are slidably inserted into each of the elongated holes 38A, 38B. The paddle 30 is configured such that a seat front-rear direction cushion support portion 30C thereof, supporting the cushion material 36, displaces in the seat width direction by the paddle 30 displacing relative to the bracket 38 while an inserted state of the guide pins 30A, 30B into the respective elongated holes 38A, 38B of the bracket 38 is maintained.

The return spring 35 is configured as tension coil spring spanning, in a tensioned state, between the cushion support portion 30C of the paddle 30 and the side frame 14B. The paddle 30 is biased by biasing force of the return spring 35 towards a position where the guide pin 30A contacts a seat width direction inside end 38AI of the elongated hole 38A, and the guide pin 30B contacts a seat rear end 38BR of the elongated hole 38B. This position is referred to as the initial position, with the cushion support portion 30C of the paddle 30, positioned furthest to the outside in the seat width direction at the seat rear side, and the separation between the left and right side supports 18 is the widest in the state when the left and right paddles 30 are positioned in the initial position.

The paddle drive mechanism 34 configuring the side support adjusting mechanism 22 is configured so as to displace the paddle 30 against biasing force from the return spring 35 by pressing the guide pin 30A towards the seat width direction outside. The paddle 30 is thereby, as shown in FIG. 3, configured such that the cushion support portion 30C displaces (changes orientation) towards the seat width direction inside (direction of arrow A) while the guide pins 30A, 30B are being guided by the elongated holes 38A, 38B of the bracket 38.

The paddle drive mechanism 34 is configured so as to convert adjustment force of the power section 32 by an operation cable 40 into pressing force on the guide pin 30A. As shown in FIG. 2 and FIG. 5, the operation cable 40 is configured to serve as a covered cable, with main elements of an inner cable 42, and an outer cable 44 covering portions of the inner cable 42 excluding the two ends of the inner cable 42. A seat width direction outside end 42A of the inner cable 42 is anchored to the bracket 38 (or to the side frame 14B) further to the seat width direction outside than a seat width direction outside end 38AO of the elongated hole 38A. A seat width direction inside end 42B of the inner cable 42 is configured so as to be pulled towards the seat width direction inside by the power section 32, described below.

The outer cable 44 has an end face 44A on the seat width direction outside that contacted but non-restrained by the seat width direction inside of the guide pin 30A, and a seat width direction inside end 44B fixed and supported by the seat back frame 14A through a fixing 46. In FIG. 5, the support structure for the fixing 46 and the seat back frame 14A has been omitted. The inner cable 42 passes through the guide pin 30A in order to secure contact between the outer cable 44 and the guide pin 30A. As shown in FIG. 5, the operation cable 40 is slack in a state when the paddles 30 are positioned in the initial position.

The paddle drive mechanism 34 is thereby configured so as to press the guide pin 30A towards the seat width direction outside while slack in the outer cable 44 is being taken up, by the seat width direction inside end 42B of the inner cable 42 being pulled towards the seat width direction inside (the opposite side to side of the paddle 30 being operated). In the side support adjusting mechanism 22, when the seat width direction inside end 42B of the inner cable 42 is displaced towards the seat width direction outside from the adjusted state of the side supports 18 shown in the example of FIG. 3, the paddle 30 is displaced towards the initial position under biasing force of the return springs 35.

The power section 32 is configured with main elements of a motor 48, serving as a drive source, and a cable pulling mechanism 50 that converts torque of the motor 48 into pulling force on the inner cable 42 towards the seat width direction inside. The motor 48 is supported (this support structure is omitted in the drawings) by the seat back frame 14A through a bracket 52, and is an electrical motor that on supply with power obtains forward and reverse rotation about an axial line of an output shaft 48A aligned running along the seat width direction. In the present exemplary embodiment, the cable pulling mechanism 50 is a screw drive mechanism that converts rotation of the output shaft 48A into linear motion along the seat width direction.

Specifically, the cable pulling mechanism 50 has a screw 50A with length direction running along the seat width direction, rotated about its own axis by the motor 48, and a nut 50B threaded on the screw 50A. In the present exemplary embodiment, the power section 32 is common to the left and right paddles 30 (paddle drive mechanism 34), and the screws 50A on the left and right sides, and the nuts 50B threaded thereon, are of opposite threads to each other. Accordingly, the cable pulling mechanism 50 is configured such that when the left and right screws 50A are rotated in a forward direction by the motor 48, the left and right nuts 50B approach each other (displace towards the seat width direction inside), and when the left and right screws 50A are rotated in the reverse direction by the motor 48, the left and right nuts 50B separate from each other (displace towards the seat width direction outside).

In the side support adjusting mechanism 22, the seat width direction inside ends 42B of the inner cables 42 are connected to the corresponding left and right nuts 50B. Therefore, in the vehicle seat 10, when the left and right screws 50A are rotated by the motor 48 in the forward direction, the inner cables 42 are pulled, and the outer cables 44 press the guide pins 30A towards the vehicle width direction outside, such that the paddles 30 displace towards the seat front direction and towards the seat width direction inside, as shown in FIG. 3. Accordingly, configuration is such that the left and right side supports 18 are adjusted so as to approach each other, as described above. The motor 48 of the power section 32 is configured so as to rotate the screws 50A in the forward or reverse directions according to operation of a handy switch, not shown in the figures, or the like by the seated occupant P.

Figure 1:
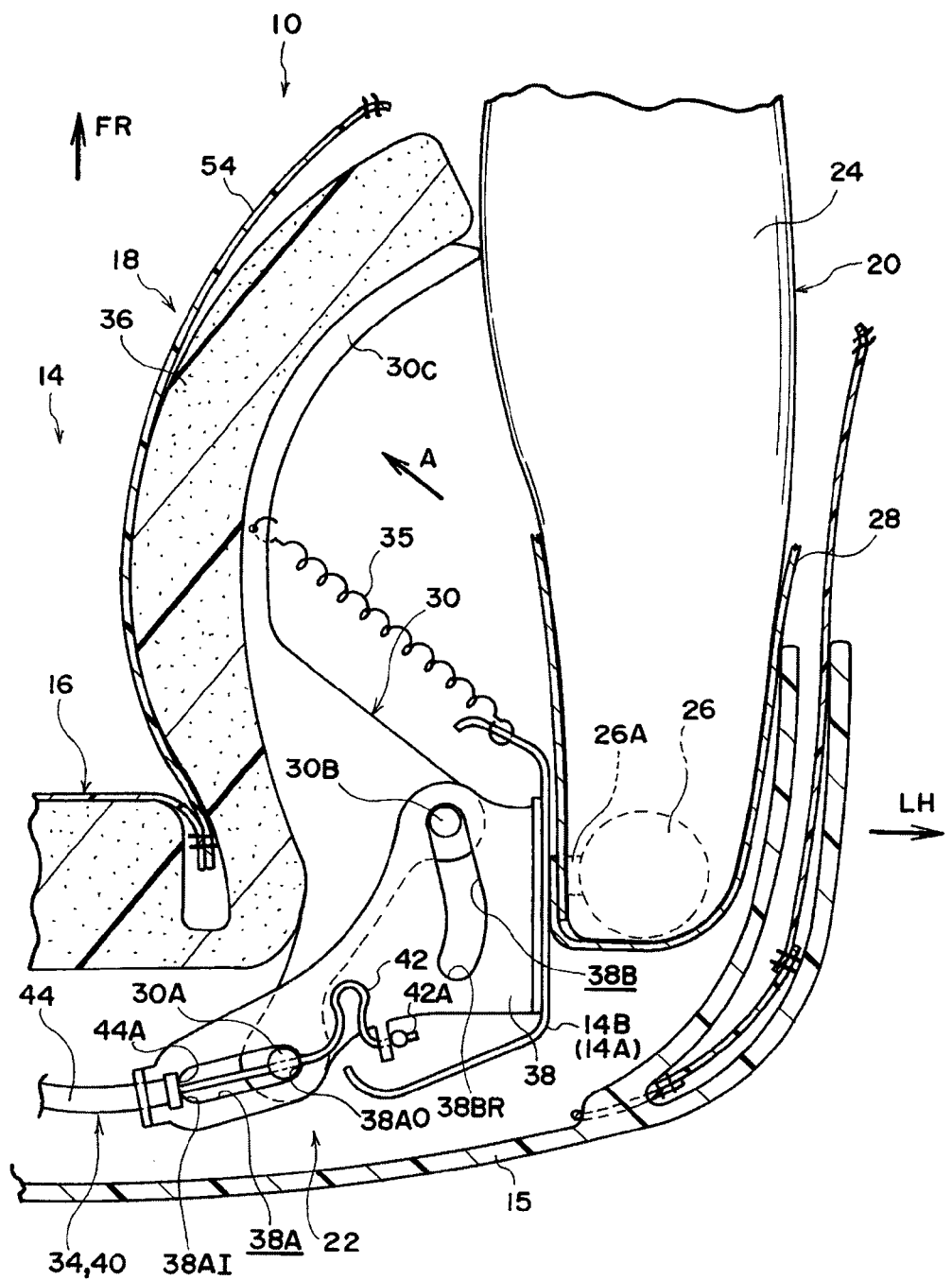
FIG. 1 is a cross-section from below showing an enlargement of a deployed state of a side airbag configuring a vehicle seat according to a first exemplary embodiment of the present invention.

In the vehicle seat 10 explained above, by the paddle drive mechanism 34 contacting the outer cable 44 from the seat width direction inside against the guide pin 30A, the paddles 30 are configured so as not to be restrained from displacement in the direction of arrow A. Therefore, when load against the biasing force of the return spring 35 from the seat rear side has been input to the cushion support portion 30C, the paddle 30 displace in the direction of arrow A against the biasing force of the return spring 35. When this occurs, the inner cable 42 of the operation cable 40 either slides relative to the guide pin 30A, or, as shown in FIG. 1, becomes slack between the guide pin 30A and the seat width direction outside end 38AO of the elongated hole 38A, and configuration is such that substantially no resisting force is generated against displacement in the direction of arrow A (generated resisting force is small). Since the outer cable 44 is also separated from the rear portion of the paddles 30 with the displacement of the paddles 30 in the direction of arrow A, configuration is such that resisting force is not generated against displacement of the paddles 30 in the direction of arrow A.

Biasing force of the return spring 35 is sufficiently small relative to the pressing force (pressing force due to deployment pressure) accompanying deployment of the side airbag 24, pressing the paddle 30 towards the seat front. Accordingly, in the vehicle seat 10, when the inflator 26 of the side airbag module 20 is actuated, the paddle 30 pressed by the side airbag 24 displaces in the direction of arrow A, as shown in FIG. 1. In the present exemplary embodiment, the paddle drive mechanism 34 (the pressing structure of the guide pin 30A by the outer cable 44 of the operation cable 40), not restraining the paddles 30 from moving in the direction of arrow A while obtaining driving of the paddles 30 in the direction of arrow A, corresponds to the frame moving structure of the present invention. The outer cable 44 corresponds to the pressing member of the present invention.

In the vehicle seat 10, as shown in FIG. 2 and FIG. 3, there is a tear portion 56 that rips with deployment of the side airbag 24 formed in the cover material 54 configuring the seat back 14. In the present exemplary embodiment, the tear portion 56 is a stitching section of the cover material 54 running along the seat top-bottom direction, disposed at the seat front-rear direction front edge and seat width direction outside edge of the side support 18. The tear portion 56 rips when imparted with deployment pressure of the side airbag 24 through the paddle 30 (the cushion material 36), so as to thereby allow deployment of the side airbag 24 towards the seat front. Note that configuration may be made such that the tear portion 56 rips due to reinforced tape of the like being imparted with tension force with inflation of the side airbag 24.

Explanation follows next of operation of the present exemplary embodiment.

In the vehicle seat 10 of the above described configuration, when a handy switch, not shown in the figures, is operated by the seated occupant P to the side that displaces the supports 18 towards the inside in the seat width direction, the screws 50A are rotated in the forward direction by the motor 48. The left and right nuts 50B then respectively displace to the inside in the seat width direction, and due to the inner cables 42 being pulled, the outer cables 44 press the guide pins 30A towards the seat width direction outside. The left and right paddles 30 are thereby displaced in the direction of arrow A together with the cushion material 36 and the cover material 54 configuring the side supports 18, and the angle of the side supports 18 relative to the back rest 16 gets smaller, narrowing the separation between the left and right side supports 18.

On the other hand, when the handy switch, not shown in the figures, is operated by the seated occupant P towards the side that displaces the side supports 18 to the seat width direction outside, the screws 50A are rotated by the motor 48 in the reverse direction. The left and right nuts 50B then displace respectively to the outside in the seat width direction, and operation cable 40 becomes slack, and the left and right paddles 30 are respectively displaced towards the initial position by biasing force from the return springs 35. The angle of the side supports 18 relative to the back rest 16 thereby gets bigger, widening the separation between the left and right side supports 18.

When the vehicle to which the vehicle seat 10 has been applied has detected a side impact to the side where the vehicle seat 10 is disposed (the nearside), the inflator 26 of the side airbag module 20 is actuated. Consequently, the side airbag 24 is internally supplied with gas generated from the inflator 26, inflates and is deployed. The pressing force due to the deployment pressure of the side airbag 24 is imparted to the cushion support portion 30C, displacing the paddle 30 in the direction of arrow A, and cushion support portion 30C is moved out of the way from the deployment region (deployment path) of the side airbag 24. The tear portion 56 is ripped by the deployment pressure of the side airbag 24.

Accordingly, in the vehicle seat 10, as shown in FIG. 1, the side airbag 24 is deployed towards the seat front at the outside relative to the side support 18. The seated occupant P of the vehicle seat 10 is protected from the side impact by the side airbag 24 that has been deployed at the vehicle width direction outside (impact side).

The vehicle seat 10 allows deployment of the side airbag 24 towards the seat front by the paddle 30 displacing in the direction of arrow A due to the deployment pressure of the side airbag 24. However, in the vehicle seat 10, since the paddle drive mechanism 34 is configured so as not to restrain displacement of the paddles 30 in the direction of arrow A (restraining force is extremely small), the side airbag 24 pushes the paddle 30 out of the way in a short period of time from the start of gas supply, deploying towards the seat front. Consequently, the seated occupant P is well protected against a side impact.

In this manner, the vehicle seat 10 according to the present exemplary embodiment can deploy the side airbag 24 well in a configuration in which the side airbag module 20 and the side support adjusting mechanism 22 are internally mounted to the side supports 18 of the seat back 14.

In particular, in the vehicle seat 10, due to employing the paddle drive mechanism 34 allowing displacement of the paddles 30 in the direction of arrow, and the side supports 18 can be easily adjusted by motive force of the motor 48 in a configuration that deploys the side airbag 24 well as described above.

Further, in the vehicle seat 10, when the side airbag 24 is being deployed, the retained state of the paddle 30 by the bracket 38 is maintained. Namely, in the vehicle seat 10, the paddle 30 does not separate from the seat back 14 with actuation of the side airbag module 20.

Furthermore, since the vehicle seat 10 has the side airbag 24 of the above described upper-lower two section or three section structure, the chest region C can be supported with an appropriate load (reaction force), while the seated occupant P is being firmly supported at the lumbar region L, or at the lumbar region L and the shoulder region S. Namely, since there is a structure in which the paddle 30, disposed with an overlap to the side airbag 24 in side view, is moved by the deployment pressure of the side airbag 24 out of the way from the deployment region of the side airbag 24, as seen in plan view, a large side airbag 24 that obtains good protection of the seated occupant P can be deployed well.

Next, explanation follows of another exemplary embodiment of the present exemplary embodiment. Note that components and portions that are fundamentally the same as the configuration of the above described first exemplary embodiment or previous are allocated the same reference numerals as in the configuration of the above described first exemplary embodiment or previous, and explanation thereof is abbreviated.

Second Exemplary Embodiment

Figure 7:
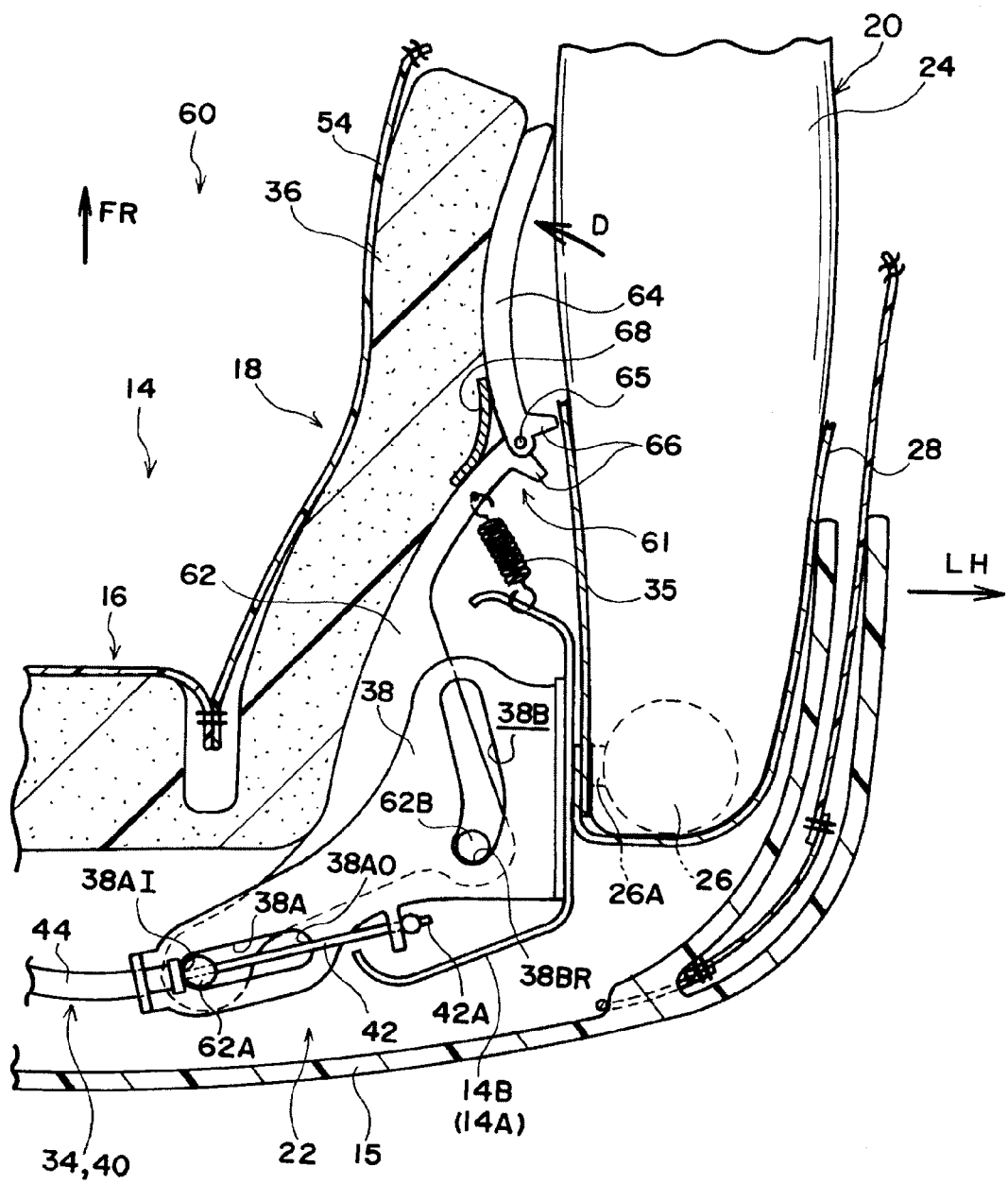
FIG. 7 is a cross-section from below showing an enlargement of a deployed state of a side airbag configuring a vehicle seat according to a second exemplary embodiment of the present invention.
Figure 8:
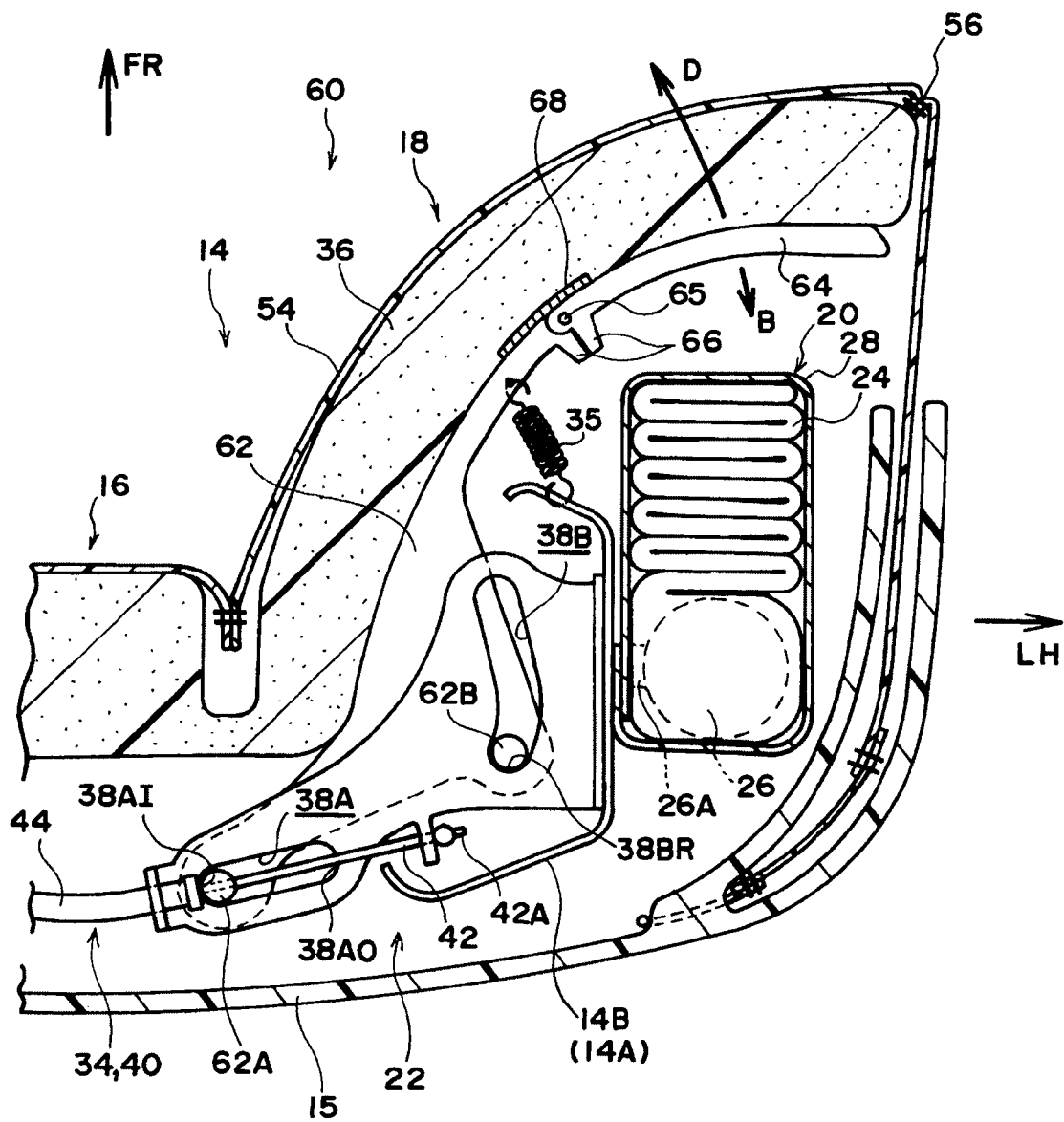
FIG. 8 is a cross-section from below showing an enlargement of a side support section configuring a vehicle seat according to the second exemplary embodiment of the present invention.

In FIG. 7, relevant potions of a vehicle seat 60 according to a second exemplary embodiment are shown during deployment of the side airbag 24 in a cross-section viewed from below corresponding to FIG. 1. In FIG. 8, a non-actuated state of the side airbag module 20 in the vehicle seat 60 is shown, in a cross-section viewed from below corresponding to FIG. 2. As shown in these figures, the vehicle seat 60 differs from the vehicle seat 10 according to the first exemplary embodiment in the point that a paddle 61 that partially displaces due to the deployment pressure of the side airbag 24 is provided, in place of the paddle 30 that displaces overall in the direction of arrow A due to the deployment pressure of the side airbag 24.

Specifically, the paddle 61 has a base 62 supported so as to be capable of relative displacement (adjusting movement) to the bracket 38, and a movable portion 64 for supporting the cushion material 36 at the seat width direction outside portion of the side supports 18. Namely, the paddle 61 is configured as if the paddle 30 had been separated into two at the cushion support portion 30C.

The base 62 has guide pins 62A, 62B equivalent to the guide pins 30A, 30B, and is supported by the bracket 38 at the guide pins 62A, 62B so as to be relatively displaceable in the direction of arrow A and the opposite direction thereto. The movable portion 64 is supported through a hinge shaft 65 running along the seat top-bottom direction so as to be relatively angularly displaceable relative to the base 62. The movable portion 64 is disposed towards the seat front relative to the side airbag module 20, and the hinge shaft 65 is disposed to the seat width direction inside relative to the side airbag module 20.

The paddle 61 also has a stopper 66 that restricts angular displacement of the movable portion 64 towards the seat rear side (the direction of arrow B in FIG. 8) relative to the base 62. The paddle 61 is configured to adopt substantially the same shape as the paddle 30 in the state in which the stopper 66 is functioning. This state of the paddle 61 is referred to as the normal state. The paddle 61 also has a leaf spring 68 for biasing the movable portion 64 in the direction of arrow B. The paddle 61 is configured so as to be retained in the normal position without rattling due to biasing force from the leaf spring 68.

However, when a load towards the seat front side exceeding the biasing force of the leaf spring 68 is input to the movable portion 64, the paddle 61 angularly displaces about the hinge shaft 65 in the direction shown by arrow D in FIG. 8, against the biasing force of the biasing force of the leaf spring 68. Accordingly, in vehicle seat 60, the movable portion 64 displaces towards the seat front side and seat width direction inside, as shown in FIG. 7, and so as to move out of the way from the deployment region of the side airbag 24. Consequently, in the present exemplary embodiment, the configuration in which the movable portion 64 is supported so as to be relatively angularly displaceable relative to the base 62 about the hinge shaft 65 corresponds to the frame moving structure of the present invention. Other parts of the vehicle seat 60 are similar to the corresponding configuration of the vehicle seat 10, including not illustrated portions.

Accordingly, a similar effect can also be obtained by the vehicle seat 60 according to the second exemplary embodiment by operation fundamentally the same as that of the vehicle seat 10 according to the first exemplary embodiment.

Supplementary explanation will now be given regarding parts of the operation of the vehicle seat 60 differing from the operation of the vehicle seat 10. In the vehicle seat 60, when adjusting the side supports 18, the paddle 61 functions as it is in the normal posture in a similar manner to the paddle 30 in the vehicle seat 10. When the inflator 26 is actuated where there is a side impact to the vehicle to which the vehicle seat 60 is applied, the movable portion 64 is pressed towards the seat front by pressing force due to the deployment pressure of the side airbag 24. Accordingly, the paddle 61 angularly displaces in the direction shown by arrow D against the biasing force of the leaf spring 68, as shown in FIG. 7, and moves out of the way from the deployment region of the side airbag 24.

Thereby, in the vehicle seat 60, in comparison to the vehicle seat 10 where the whole of the paddle 30 moves out from the deployment region of the side airbag 24, the movable portion 64 moving out from the deployment region is small. Consequently, in the vehicle seat 60, the deployment region of the side airbag 24 can be secured in an even shorter time with a lower load.

Third Exemplary Embodiment

Figure 9:
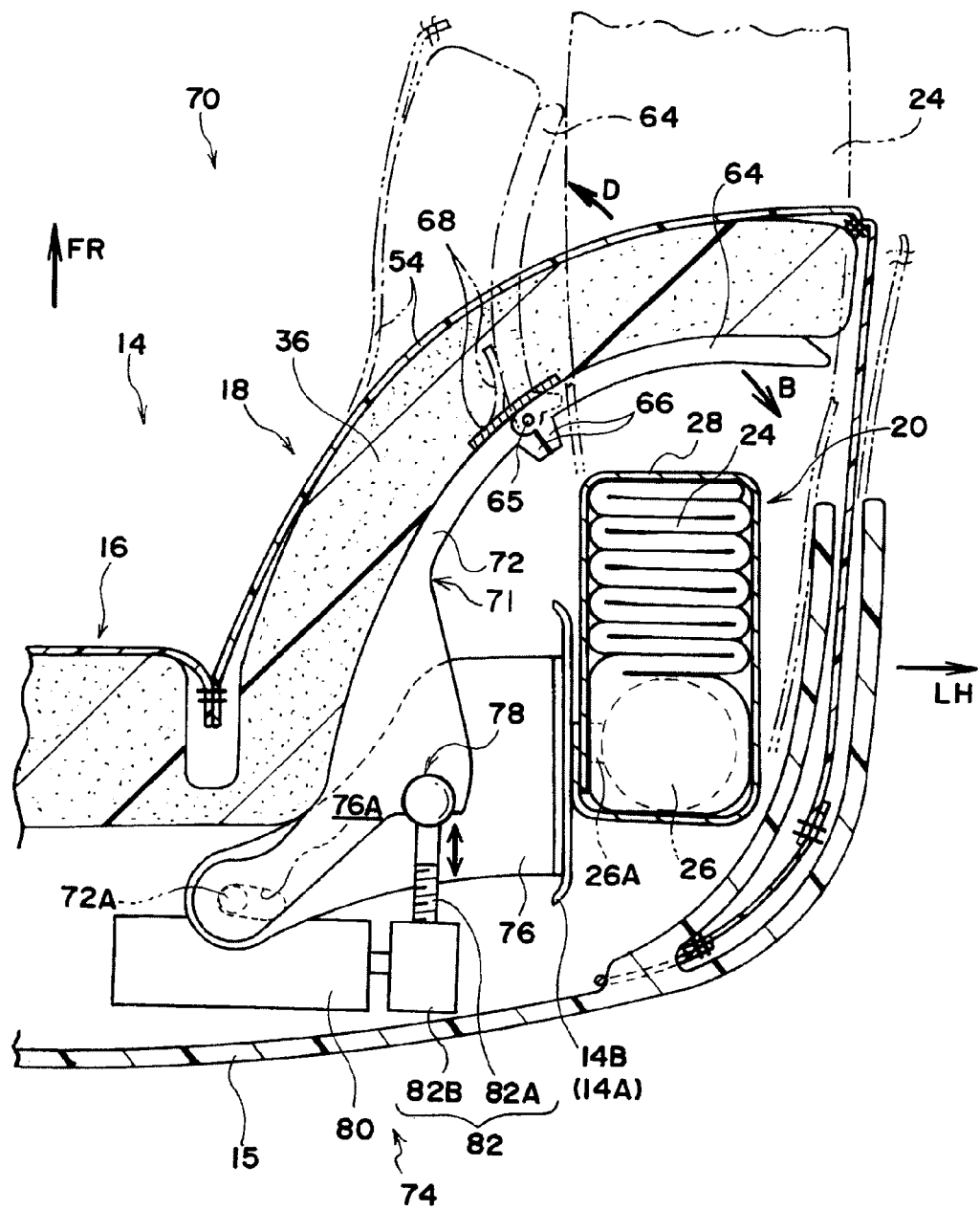
FIG. 9 is a cross-section from below showing an enlargement of a side support section configuring a vehicle seat according to a third exemplary embodiment of the present invention.

In FIG. 9, relevant portions of a vehicle seat 70 according to a third exemplary embodiment of the present invention are shown in a cross-section viewed from below. In FIG. 9, the deployed state of the side airbag 24 is shown by imaginary lines. As shown in the figure, the vehicle seat 70 differs from the vehicle seat 60 according to the second exemplary embodiment in the point that a side support adjusting mechanism 74 is provided that drives paddles 71 in both directions, in place of the side support adjusting mechanism 22 having the paddle drive mechanism 34 for driving the paddles 30 in one direction.

The paddle 71 has a base 72 and movable portion 64. The base 72 is supported from a side frame 14B through a bracket 76. Specifically, the base 72 is supported by the bracket 76 so as to be rotatable about a guide pin 72A provided at the seat rear edge side and seat width direction inside edge. By the guide pin 72A being inserted into an elongated hole 76A having a length direction in the seat width direction, the bracket 76 allows rotation about the guide pin 72A of the base 72 and displacement in the seat width direction.

The side support adjusting mechanism 74 is configured such that an intermediate portion in the seat width direction (namely in the seat front-rear direction) of the base 72 is driven in the seat front-rear direction. A cushion support portion (a portion for supporting the cushion material 36 configured at a portion of the base 72 and at the movable portion 64) of the paddle 71 is thereby configured so as to displace in both directions in the seat width direction. The connection portion between the base 72 and the side support adjusting mechanism 74 is a ball joint 78. Change of the posture of the base 72 relative to the side support adjusting mechanism 74 is allowed by the ball joint 78 and the elongated hole 76A of the bracket 76.

The side support adjusting mechanism 74 according to the present exemplary embodiment is configured with main elements of a motor 80, serving as a drive source, and a linear motion mechanism 82, serving as a frame drive mechanism, for converting rotation of the motor 80 into linear movement in the seat front-rear directions. The linear motion mechanism 82 has a push rod 82A connected to the base 72 through the ball joint 78, and a gear box 82B for converting rotation of the motor 80 into linear movement of the push rod 82A. The gear box 82B can, for example, be configured by a nut threaded on a screw formed to the push rod 82A, a worm wheel formed on the external periphery of the nut, and worm provided to the rotation shaft of the motor 80 and meshed with the worm wheel. In this configuration, the motor 80 (rotation axis direction thereof) can be disposed running along the seat width direction or running along the seat top-bottom direction (the seat width direction in the example of FIG. 9). In this example, the ball joint 78 also allows rotation of the push rod 82A about its own axis relative to the base 72. Other parts of the configuration of the vehicle seat 70 are similar to those of the corresponding configuration of the vehicle seat 60 including the not illustrated portions.

Consequently, a similar effect can be obtained by the vehicle seat 70 according to the third exemplary embodiment by fundamentally the same operation to that of the vehicle seat 60 according to the second exemplary embodiment (or vehicle seat 10).

Supplementary explanation follows of parts of the operation of the vehicle seat 70 differing from the operation of the vehicle seat 60. In the vehicle seat 70, the paddles 71 are driven by driving force of the side support adjusting mechanism 74, both when narrowing and when widening the separation of the left and right side supports 18. Therefore, the vehicle seat 70 can be configured without the return springs 35. In the vehicle seat 70, since the movable portion 64 displaces in the direction of arrow D by pressing force due to the deployment pressure of the side airbag 24 when there is a side impact, the base 72 can be configured to be driven by the side support adjusting mechanism 74. Namely, in the vehicle seat 70, the deployment path of the side airbag 24 can be secured without relying on a non-restraining configuration for displacing the paddle 61 towards the inside in the seat width direction (the paddle drive mechanism 34).

Fourth Exemplary Embodiment

Figure 10:
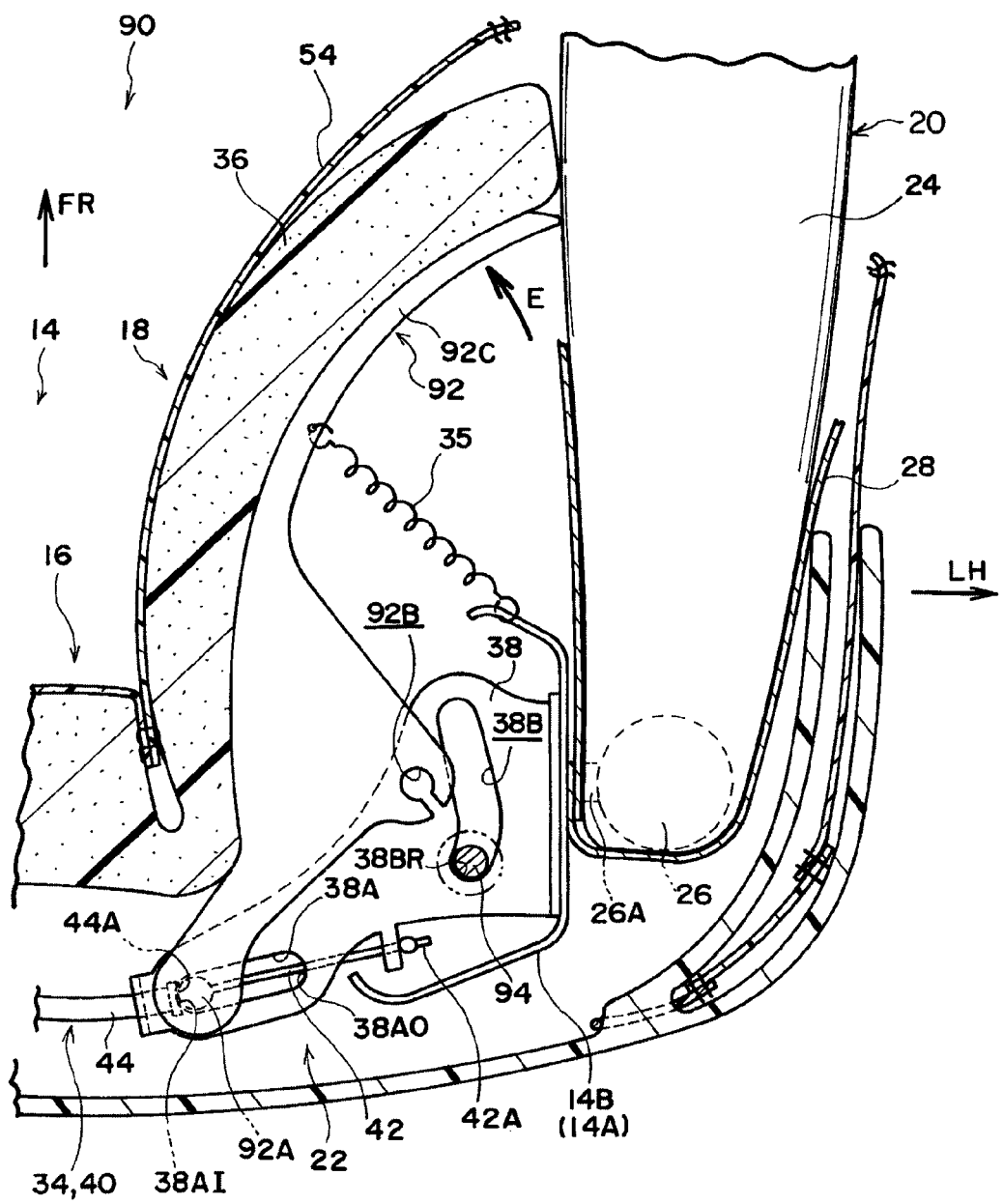
FIG. 10 is a cross-section from below showing an enlargement of a deployed state of a side airbag configuring a vehicle seat according to a fourth exemplary embodiment of the present invention.
Figure 11:
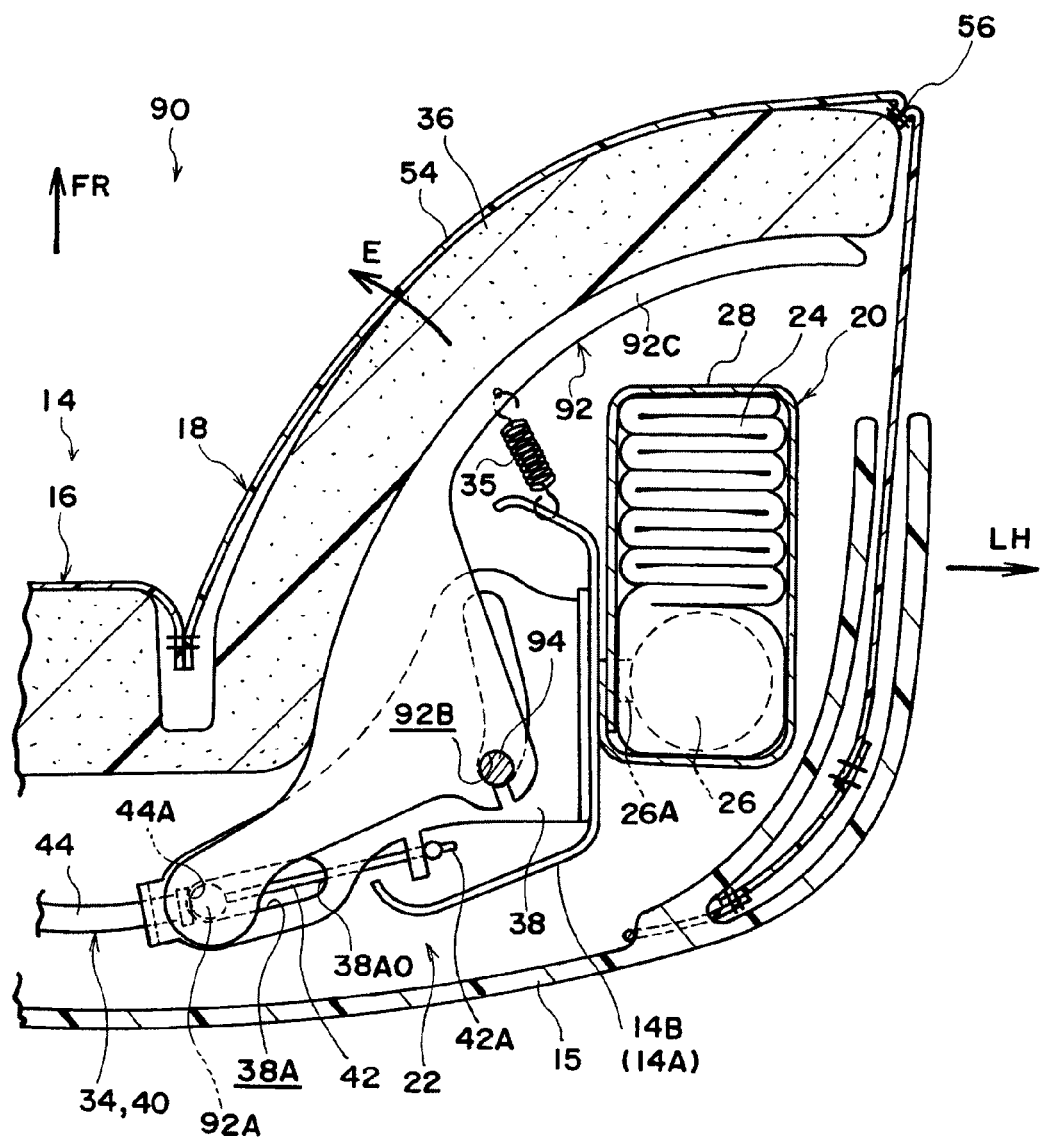
FIG. 11 is a cross-section from below showing an enlargement of a side support section configuring a vehicle seat according to the fourth exemplary embodiment of the present invention.

In FIG. 10, relevant portions of a vehicle seat 90 according to a fourth exemplary embodiment of the present invention are shown in a cross-section viewed from below when the side airbag 24 is deployed, corresponding to FIG. 1. FIG. 11 shows a non-actuated state of the side airbag module 20 in the vehicle seat 90 in a cross-section viewed from below corresponding to FIG. 2. As shown in these figures, the vehicle seat 90 differs from the vehicle seat 10 according to the first exemplary embodiment in the point that a paddle 92 is provided with a portion that separates from a bracket 38, in place of the paddle 30 that displaces in the direction of arrow A while maintaining a guided state with the bracket 38 by the guide pins 30A, 30B.

The paddle 92 is formed in substantially the same shape overall as the paddle 30, and has a guide pin 92A corresponding to the guide pin 30A, a slit 92B formed at a position corresponding to the guide pin 30B, and a cushion support portion 92C corresponding to the cushion support portion 30C. The slit 92B is open substantially to the seat rear direction in plan view, and is separably engaged (fitted over) a guide pin 94 guided in a state prevented from pulling out from the elongated hole 38B of the bracket 38.

When the paddle 92 explained above is imparted at the cushion support portion 92C with a load towards the seat front side of a specific value or greater, engagement with the guide pin 94 is released by deformation of the periphery of the slit 92B, such that the paddle 92 rotatably displaces (displaces in the direction of arrow E) about the guide pin 92A. Consequently, in the present exemplary embodiment, the fitted structure of the guide pin 94 into the slit 92B corresponds to the frame moving structure of the present invention. Other parts of the configuration of the vehicle seat 90 are similar to corresponding configurations of the vehicle seat 10 including the not illustrated portions.

Consequently, a similar effect may be obtained by the vehicle seat 90 according to the fourth exemplary embodiment by fundamentally the same operation to that of the vehicle seat 10 according to the first exemplary embodiment.

Supplementary explanation follows of parts of the operation of the vehicle seat 90 that differ from the operation of the vehicle seat 10. In the vehicle seat 60, when the inflator 26 is actuated when there is a side impact to the vehicle to which the vehicle seat 60 applied, the cushion support portion 92C is pressed towards the seat front by a load of the specific value or greater by pressing force due to deployment pressure of the side airbag 24. Accordingly, engagement of the guide pin 94 in the slit 92B is released and the paddle 92 separates from the bracket 38. The paddles 92 then, as shown in FIG. 10, displace in the direction of arrow E about the guide pin 92A against biasing force of the return spring 35, and moves out of the way from the deployment region of the side airbag 24.

In the vehicle seat 90, the paddles 92 thereby separates from the bracket 38 and moves out of the way from the deployment region of the side airbag 24. Consequently, in the vehicle seat 90, in comparison to the vehicle seat 10 in which the whole of the paddle 30 moves out of the way from the deployment region of the side airbag 24 while being guided by the bracket 38, the displacement amount (stroke) for the paddle 92 to move out of the way is small. However, since the engaged state with the bracket 38 is retained at the guide pin 92A, the paddle 92 does not become separated from the seat back 14 with actuation of the side airbag module 20.

Fifth Exemplary Embodiment

Figure 12:
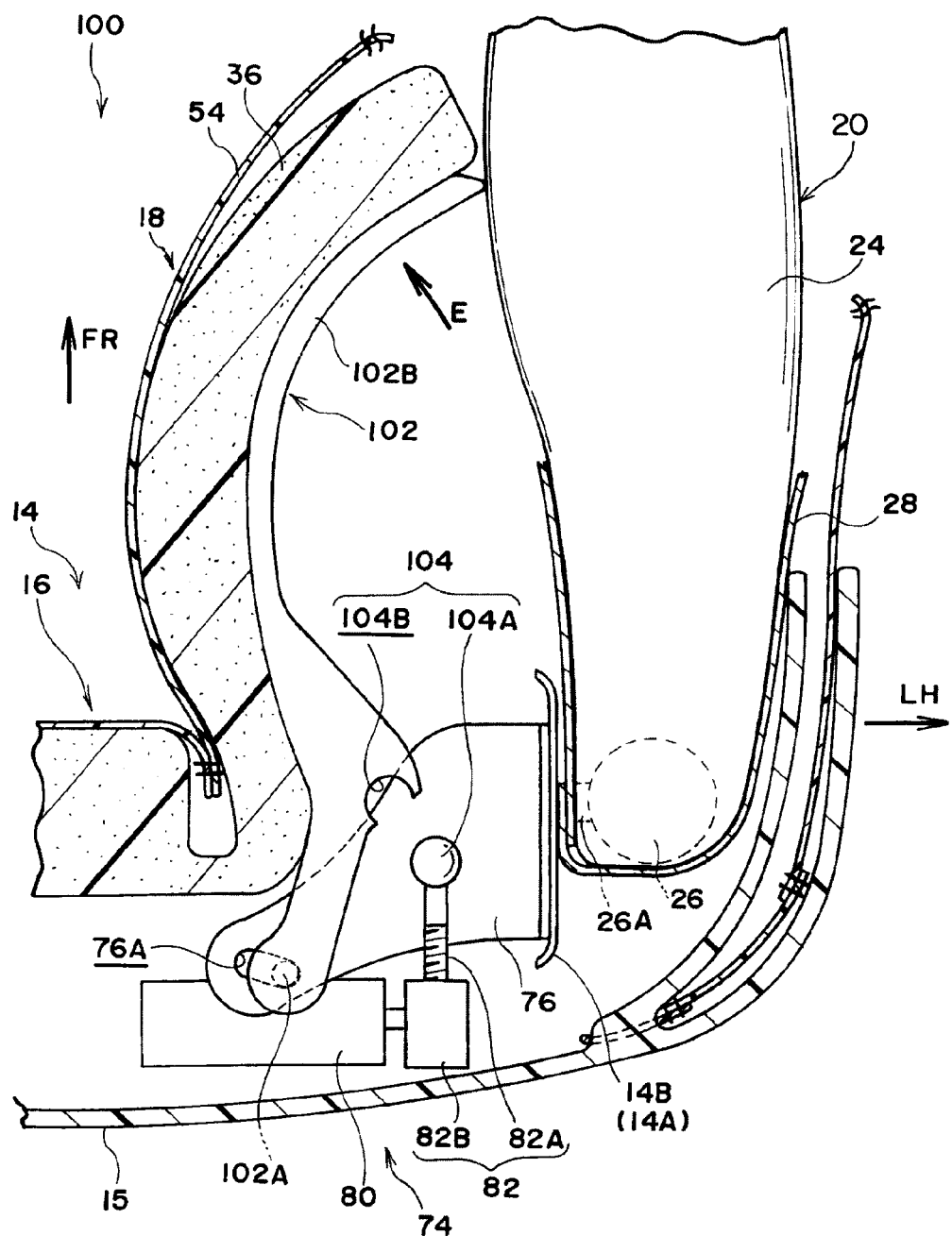
FIG. 12 is a cross-section from below showing an enlargement of a deployed state of a side airbag configuring a vehicle seat according to a firth exemplary embodiment of the present invention.
Figure 13:
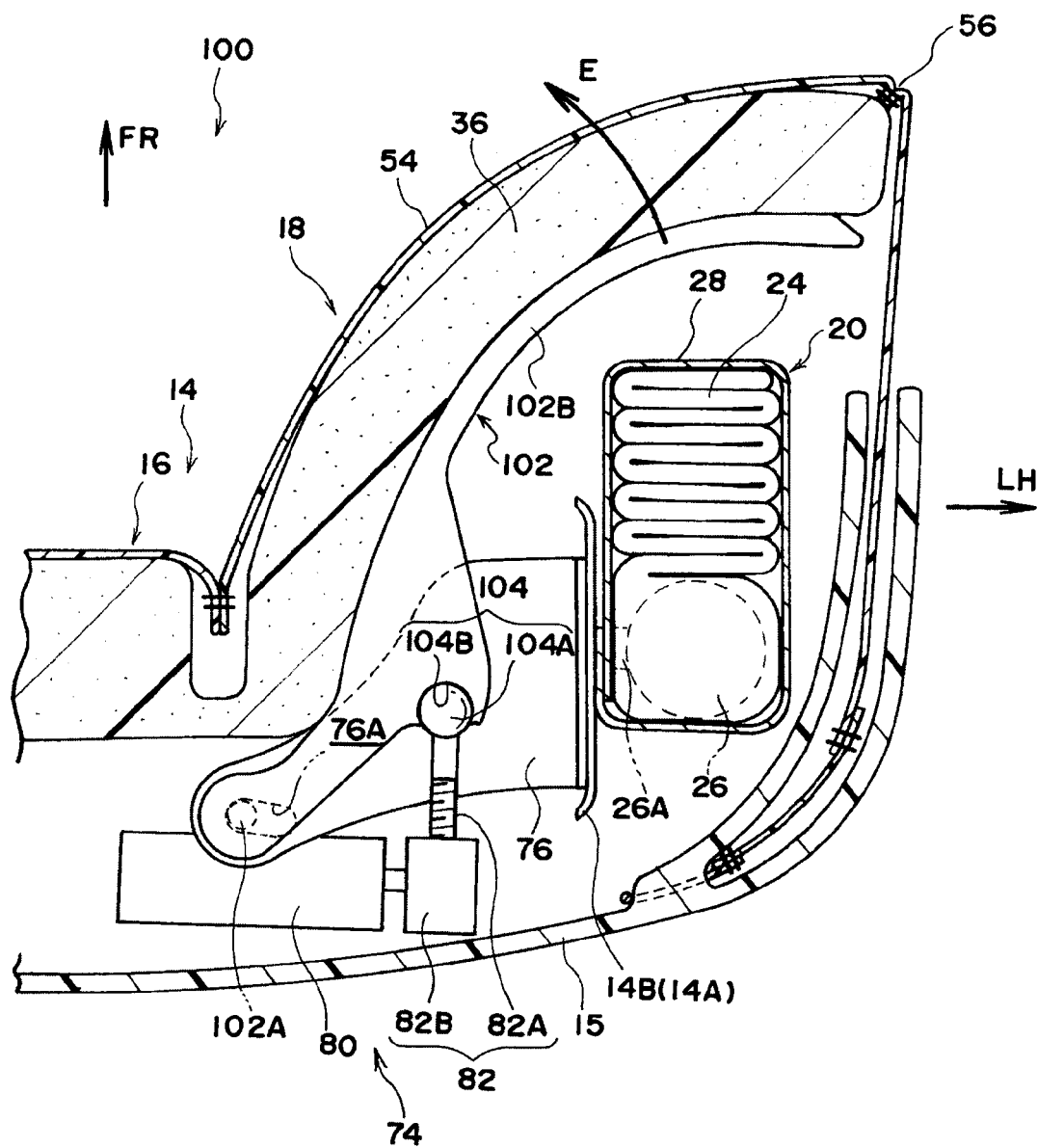
FIG. 13 is a cross-section from below showing an enlargement of a side support section configuring a vehicle seat according to the fifth exemplary embodiment of the present invention.

FIG. 12 shows a cross-section viewed from below corresponding to FIG. 1 of relevant portions of a vehicle seat 100 according to a fifth exemplary embodiment of the present invention when the side airbag 24 is deployed. FIG. 13 shows a cross-section viewed from below corresponding to FIG. 2 of a non-actuated state of a side airbag module 20 in the vehicle seat 100. As shown in these figures, the vehicle seat 100 differs from the vehicle seat 90 according to the fourth exemplary embodiment in the point that a side support adjusting mechanism 74 for driving paddles 102 in both directions is provided, in place of the side support adjusting mechanism 22 having the paddle drive mechanism 34 that drives the paddles 92 in one direction.

The paddles 102 are configured as if the base 72 and the movable portion 64 of the paddle 71 had been integrated (fixed) together. In the paddle 102, a guide pin 102A provided in the vicinity of the inside edge in the width direction and the rear edge in the seat front-rear direction is inserted into an elongated hole 76A of a bracket 76. The paddle 102 is configured such that a cushion support portion 102B is displaced in the seat width direction by movement of a push rod 82A of a side support adjusting mechanism 74 connected to substantially the central portion in the seat width direction (namely substantially the central portion in the seat front-rear direction) in the seat front-rear direction.

Therefore, the connection portion of the paddle 102 and the push rod 82A is a ball joint 104 that functions similarly to the ball joint 78. The ball joint 104 is configured so as to separate into the paddles 102 side thereof and the linear motion mechanism 82 side thereof, as shown in FIG. 12, when a load of a specific value or greater acts on the cushion support portion 102B towards the seat front side. In the present exemplary embodiment, the ball joint 104 is configured with a ball portion 104A formed at the distal end of the push rod 82A, and a fitting slit 104B formed to the paddle 102 being separably engaged with (fitted into) the ball portion 104A. Other parts of the configuration of the vehicle seat 100 are similar to corresponding configurations of the vehicle seat 90 including not illustrated portions.

Consequently, the vehicle seat 100 according to the fifth exemplary embodiment can also obtain a similar effect by fundamentally the same operation to that of the vehicle seat 90 according to the fourth exemplary embodiment (or the vehicle seat 10).

Supplementary explanation follows of parts of the operation of the vehicle seat 100 differing from the operation of the vehicle seat 90. In the vehicle seat 100, the paddles 102 are driven by driving force of the side support adjusting mechanism 74 both when narrowing and when widening the separation of the left and right side supports 18. Therefore, the vehicle seat 100 can be configured without the return springs 35. In the vehicle seat 100, since the cushion support portion 102B is displaced in the direction of arrow E by pressing force due to the deployment pressure of the side airbag 24 when there is a side impact, the paddles 102 can be configured to be driven by the side support adjusting mechanism 74. Namely, in the vehicle seat 100, the deployment path of the side airbag 24 can be secured without relying on a non-restraining configuration (the paddle drive mechanism 34) for displacement of the paddles 102 towards the inside in the seat width direction.

Note that in each of the exemplary embodiments described above examples have been given where the side airbag 24 is a two section or three section structure. However, the present invention is not limited thereto, and, for example, configuration may be made in which the side airbag 24 has a single chamber.

In each of the exemplary embodiments described above, examples are shown in which the side airbag 24 is provided to the seat back 14 at a vehicle width direction outside portion (nearside). However, the present invention is not limited thereto, and, for example, configuration may be made in which the side airbag 24 is provided to the seat back 14 at a vehicle width direction inside portion (far side). In such cases, configuration may be made in which side airbags at the vehicle width direction inside and outside receive gas supply from a common inflator 26.

Furthermore, in each of the exemplary embodiments described above, examples are shown in which the paddle drive mechanism 34 or the linear motion mechanism 82 is configured employing a thread feed mechanism. However, the present invention is not limited thereto, and, for example, configuration may be made with a rack and pinion mechanism, a linear motor, or the like employed as the paddle drive mechanism 34 or the linear motion mechanism 82, and the seat width direction inside end 42B of the inner cable 42 and the paddles 71, 92 may be driven by a mechanism other than a linear motion mechanism. In the first, second and fourth exemplary embodiments, examples are shown in which the paddles 30 and the like are driven towards the seat width direction inside, while allowing the paddles 30 and the like to displace to the seat width direction inside, by the outer cable 44 pressing the guide pin 30A, 62A, 92A towards the seat width direction outside. However, the present invention is not limited thereto, and, for example, configuration may be made with the push rod 82A disposed so as to be driven in the seat width direction, such that the guide pin 30A and the like are pressed by the push rod 82A.

Furthermore, in the second and third exemplary embodiments described above, examples are shown in which the movable portion 64 is supported relative to the base 62, 72 through the hinge shaft 65. However, the present invention is not limited thereto, and, for example, configuration may be made with a movable portion provided for deforming (bending or the like) relative to the base 62.

Also, in the exemplary embodiments described above, examples are shown in which the side supports 18 are adjusted by driving force of the motor 48, 80. However, the present invention is not limited thereto, and, for example, configuration may be made in which the side supports 18 are adjusted (the paddles 30, 62, 72, 92, 102 are driven) by imparting manual force by manual operation by the seated occupant P.

The invention claimed is:

1. A vehicle seat comprising:
   a side support adjusting mechanism including a frame member of a side support of a seat back and a frame drive mechanism that receives adjustment force and displaces the frame member in a seat width direction;
   a side airbag provided in a folded state at a seat width direction edge portion within the seat back so as to overlap with the frame member in side view, which inflates by receiving a gas supply and deploys towards the front in the seat front-rear direction; and
   a frame moving structure for displacing a portion of the frame member including at least an outside portion in the seat width direction, or the whole of the frame member, inward in the seat width direction by deployment pressure of the side airbag.

2. The vehicle seat of claim 1, wherein the side support adjusting mechanism is configured to allow displacement of the frame member inward in the seat width direction by the frame drive mechanism in a state in which relative displacement of the frame member inward in the seat width direction is allowed, and the side support adjusting mechanism is configured to further include a biasing member that biases the frame member outward in the seat width direction, as a result of which the frame moving structure is configured so as to displace the frame member inward in the seat width direction against biasing force of the biasing member by the frame member being pressed forwards in the seat front-rear direction by deployment pressure of the side airbag.

3. The vehicle seat of claim 2, wherein the frame drive mechanism is configured so as to displace a front portion of the frame member in the seat front-rear direction inward in the seat width direction by a press member that does not restrain the frame member, pressing a seat front-rear direction rear portion of the frame member outward in the seat width direction, and the frame moving structure is configured so as to displace the seat front-rear direction front portion of the frame member inward in the seat width direction against the biasing force of the biasing member by the front portion of the frame member being pressed forwards in the seat front-rear direction by deployment pressure of the side airbag.

4. The vehicle seat of claim 1, wherein the frame moving structure is configured so as to displace the frame member inward in the seat width direction by a connected state of the frame member to the frame drive mechanism being released by deployment pressure of the side airbag.

5. The vehicle seat of claim 4, wherein in the side support adjusting mechanism, the frame drive mechanism is connected to the frame member at a plurality of locations, and the frame moving structure is configured so as to displace the frame member inward in the seat width direction by a connected state of one connection location of the frame member to the frame moving structure being released by deployment pressure of the side airbag while a connected state of another portion of the frame member to the frame drive mechanism is maintained.

6. The vehicle seat of claim 1, wherein the frame moving structure is configured with the outside portion of the frame member in the seat width direction being a movable portion that is either deformable or relatively displaceable with respect to an inside portion of the frame member, such that the movable portion is displaced inward in the seat width direction by the movable portion being pressed forwards in the seat front-rear direction by deployment pressure of the side airbag.

7. The vehicle seat of claim 1, wherein the side support adjusting mechanism is configured to further include a drive source that generates adjustment force for the side support.

8. The vehicle seat of claim 1, wherein the frame member is configured to be disposed in a seat top-bottom direction in a region of the abdominal region of a seated occupant, and the side airbag is deployed in the seat top-bottom direction so as to be capable of restraining from the chest region to the lumbar region or from the shoulder region to the lumbar region of the seated occupant.

* * * * *